United States Patent [19]
Heisson

[11] Patent Number: 4,778,191
[45] Date of Patent: Oct. 18, 1988

[54] WASTE TRANSPORTER

[76] Inventor: Gary J. Heisson, 86 Rockland Rd., Auburn, Mass. 01501

[21] Appl. No.: 51,718

[22] Filed: May 20, 1987

[51] Int. Cl.⁴ .............................................. B62B 1/10
[52] U.S. Cl. .................................. 280/47.26; 220/1 T; 220/22; 280/47.33
[58] Field of Search ............... 280/47.26, 47.24, 47.33; 222/184; 184/1.5, 106; 220/22

[56] References Cited

U.S. PATENT DOCUMENTS

| | | | |
|---|---|---|---|
| 962,148 | 6/1910 | Jackson | 280/47.26 |
| 3,007,699 | 11/1961 | Taylor | 280/47.17 |
| 3,610,457 | 10/1971 | Opalewski | 220/22 |
| 4,362,309 | 12/1982 | Stamper | 280/47.33 |
| 4,600,113 | 7/1986 | Demars | 280/47.26 |
| 4,607,857 | 8/1986 | Le Sage et al. | 280/47.26 |
| 4,635,950 | 1/1987 | Le Sage et al. | 280/47.26 |

FOREIGN PATENT DOCUMENTS 141474  7/1953  Sweden ............................ 280/47.26

*Primary Examiner*—John J. Love
*Assistant Examiner*—Eric Culbreth
*Attorney, Agent, or Firm*—Morse, Altman, Dacey & Benson

[57] ABSTRACT

A hot waste oil or shortening transport device comprising an elongated wholly closed tank or the like with an entry-exit chute at one end and wheels on the other end. A handle at the chute end serves to wheel the tank to a disposal point where the chute acts as a fulcrum by which to pivot the tank up and pour out the contents, with the greatest safety. The device cannot be set upright, in which postion it would be liable to upset or knock-over.

4 Claims, 1 Drawing Sheet

U.S. Patent    Oct. 18, 1988    4,778,191
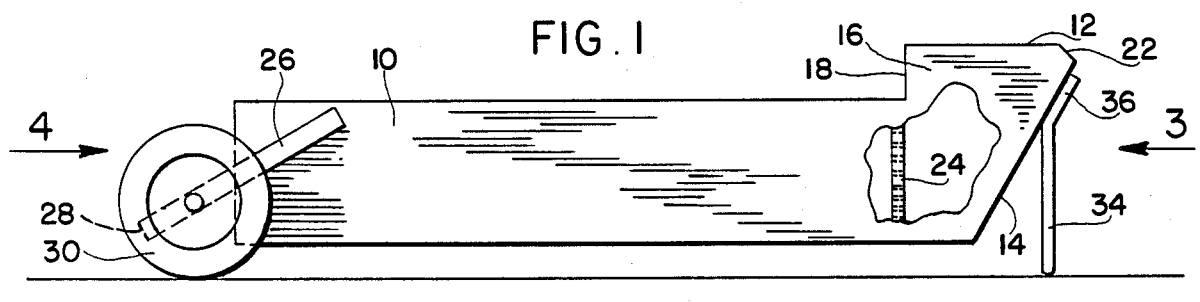
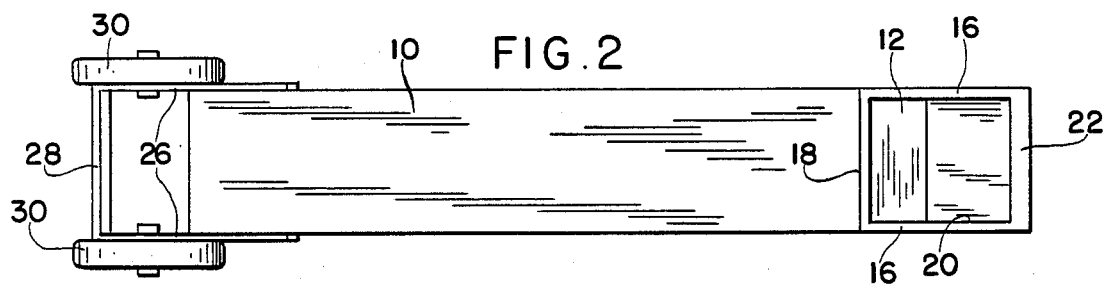
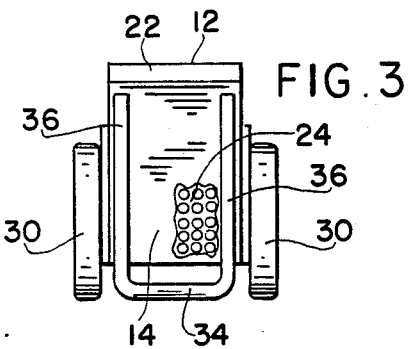
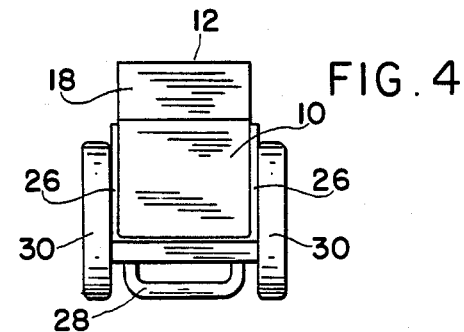
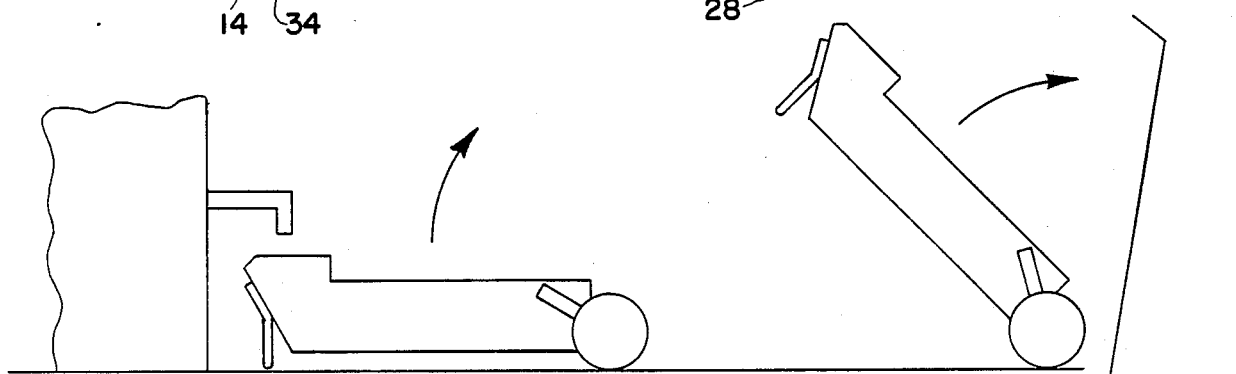
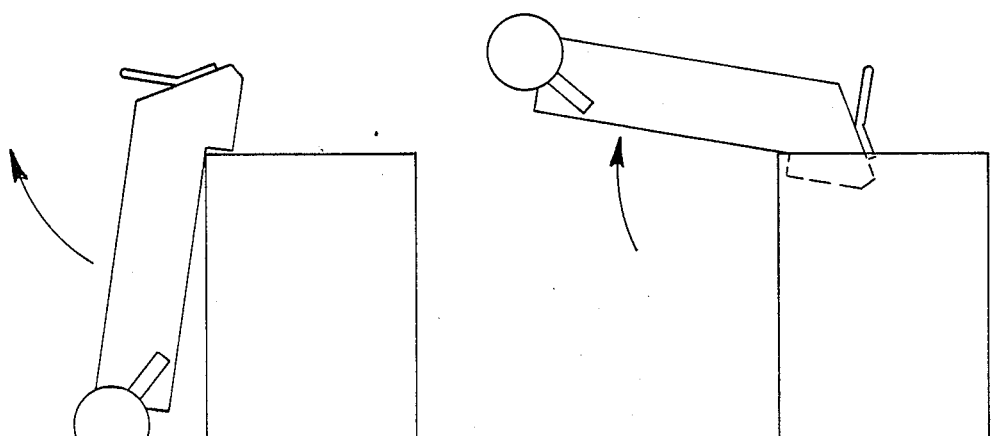

WASTE TRANSPORTER

FIELD OF THE INVENTION

Carrier device for receiving hot waste cooking oil and using the device to transport the waste oil to a disposal area.

BACKGROUND OF THE INVENTION

There is a need for hot oil waste disposal in restaurants that deal in deep or French fried foods, and such devices or systems are necessarily safe, e.g. against spilling, surging, and flushing, while at the same time they have to be simple and inexpensive. The present invention presents an improvement over the art and is safer and easier to use. It is especially important that a busy employee should not be able to accidentally bump into and knock over an upright container of the hot oil, or otherwise cause accidental spills, and this can happen where the transporter is adapted to stand on end.

SUMMARY OF THE DISCLOSURE

An elongated container of aluminum or stainless steel, etc., is completely closed with the exception of a filling chute at one end, this chute having an angled entrance to the interior of the container. This entrance is adapted to be placed directly under a waste oil drain or outlet for convenience in depositing the hot oil into the container, and the chute is located to generally extend upwardly when the container is located on the floor with its long axis horizontal. Between the chute and container per se there is a perforated plate that prevents any sudden rearward surge or flush of the oil that might be caused accidentally. The entire container, chute, and plate are substantially integral, being welded where needed. A U-shaped handle is secured to the chute and serves to in part manually manipulate the container and to keep it out of direct contact with the floor. This handle is at one extreme end of the device.

There is another U-shaped member at the opposite or fully closed end of the container and this member extends outwardly beyond the end of the container at an angle to the longitudinal axis of the container and at an angle thereto. The closed end of this U-shaped member also serves as a handle and the two legs thereof as supports for a pair of spaced, parallel, axially aligned wheels. These wheels cooperate with the first described U-shaped handle to prevent the bottom of the elongated container from touching the adjacent floor.

The device is otherwise free of any other parts. It has no door, nothing upon which it might be set upright, etc., so that it must lie horizontal upon the ground or floor, and cannot be accidentally knocked over. Should it be lifted by the wheel end when it is full, the oil will not surge out all of a sudden, as the perforated plate restricts the flow. Essentially, it can only be filled as desired; lifted at the chute end by the handle at that end, it is trundled along, at an incline to the floor, on its wheels, to the final receptacle, where it is rested on the edge of the receptacle by the outstanding chute, and then lifted by the handle at the wheel end to empty it out through the chute into the final depository receptacle. The transporter is never lifted completely from the floor, as it always has a portion on the floor or on the final receptacle.

BRIEF DESCRIPTION OF THE DRAWINGS

FIG. 1 is a side elevational view of the invention, part broken away to show the perforated plate;

FIG. 2 is a top plan view;

FIG. 3 is an end view looking in the direction of arrow 3 in FIG. 1;

FIG. 4 is an end view looking in the direction of arrow 4 in FIG. 1; and

FIG. 5 is a diagrammatic showing of the invention in operation.

PREFERRED EMBODIMENT OF THE INVENTION

An elongated tank or vat 10 is completely enclosed except for a chute 12 at one end. This chute has a front side 14 at an angle to the general main longitudinal axis of the tank, side walls 16, rear wall 18, and an open top as at 20. Any material entering the chute through the open top will be directed by the front side of the chute into the container tank. At the upper edge of front side 14 there is a small turned in lip 22 that may be useful as a handle in some cases as desired. It also helps to avoid splash when material falls down onto the interior surface of the side 14.

Between the main body of the container tank and the chute there is a perforated partition 24 through which the material flows freely in either direction, but should a surge of material in the tank suddenly occur because of possible mishandling, it will be greatly reduced because of this partition.

The end of the container tank opposite the chute 12 is fully closed. On the tank at each of two opposite sides there are secured the ends of legs 26 of a U-shaped bracket 28 which extends down at an angle and past the end of the tank. This bracket acts as a handle and also mounts wheels 30 so that the peripheries of the wheels extend well beyond the tank at this end and slightly below the bottom.

A U-shaped bracket 34 is secured at the ends of its legs as at 36 to the chute at the exterior surface of chute front side 14, and these legs then extend down to a point below the tank bottom commensurate with the same extent of wheels so that the wheels and the closed end of bracket 34 form a support for the entire container holding it slightly off the floor indicated as ground level in FIG. 1. Thus, hot waste oil in the container will not directly transfer heat to the floor and cooling of the hot material is not significantly slowed while the container is being filled. Also, bumps on the floor do not dent the tank.

The use of the device is illustrated in the diagram, FIG. 5. The container is placed on the floor with the open chute under the hot waste oil orifice. When it is decided to dump the oil, the container is lifted at the chute end thereof to a degree to suit the operator, and trundled to the ultimate waste disposal container, which has an open top, forming a rim on which the chute is rested. Then, by handle bracket 28, the container tank is pivoted up so that all the oil or other material is gradually emptied out the chute into the disposal container. The system is very safe: the tank cannot be dumped accidentally, anyone falling over it will not cause splashing of hot oil, any splashing or surging of the contents is very unlikely, the tank itself need not be touched, and the contents must surely have to be all poured into the disposal barrel or other terminus with a relatively slow action, no sudden dumping or splash occurring. Also, the entire device never needs to be lifted as a whole to dispose of the waste.

I claim:

1. A fluid waste transporter comprising:
   (a) an elongated container having a hollow interior enclosed by walls on all sides and by an end wall at one end and provided with a chute at the other end, said chute being in communication with said hollow interior;
   (b) a perforated partition mounted at said other end of said elongated container and in parallel spaced relation to said end wall, said perforated partition extending across said hollow interior and separating said hollow interior from said chute;
   (c) said chute formed with a front side disposed at an angle to both said perforated partition and said end wall, the free edge of said front side terminating in a reentrant lip;
   (d) a first U-shaped member secured at one end to said front side of said chute adjacent said reentrant lip thereof and extending at its other end in parallel spaced relation to both said perforated partition and said end wall beyond said elongated container;
   (e) a second U-shaped member secured at one end to said elongated container adjacent its said end wall and extending at its other end in a direction at an angle to and beyond said end wall; and
   (f) a pair of wheels mounted to said second U-shaped member about an axis located in front of said end wall such that its peripheries and said first U-shaped member combine to support said elongated container in substantially parallel spaced relation to ground.

2. The fluid waste transporter of claim 1 wherein said chute extends beyond the confines of said container in a direction diametrically opposed to said extension of said first U-shaped member.

3. The fluid waste transporter of claim 2 wherein said chute is open except for its reentrant lip.

4. The fluid waste transporter of claim 3 wherein said elongated container is made from one of aluminum and stainless steel.

* * * * *